United States Patent
Sorrentino et al.

(10) Patent No.: US 7,080,060 B2
(45) Date of Patent: Jul. 18, 2006

(54) SYSTEM AND METHOD FOR INTELLIGENT DATA CACHING

(75) Inventors: Anthony L. Sorrentino, Ballwin, MO (US); Rachel M. Smith, St. Louis, MO (US)

(73) Assignee: SBC Properties, L.P., Reno, NV (US)

( * ) Notice: Subject to any disclaimer, the term of this patent is extended or adjusted under 35 U.S.C. 154(b) by 516 days.

(21) Appl. No.: 10/338,172

(22) Filed: Jan. 8, 2003

(65) Prior Publication Data

US 2004/0133731 A1 Jul. 8, 2004

(51) Int. Cl.
 *G06F 17/30* (2006.01)

(52) U.S. Cl. .................. 707/1; 707/200; 707/103 R; 707/203; 707/104.1; 707/205

(58) Field of Classification Search ............ 707/2, 707/7, 8, 200, 201, 202, 203, 204, 205, 1, 707/103 R, 104.1
See application file for complete search history.

(56) References Cited

U.S. PATENT DOCUMENTS

| | | | | |
|---|---|---|---|---|
| 4,967,341 A * | 10/1990 | Yamamoto et al. | ............ | 707/2 |
| 5,003,460 A | 3/1991 | Flueter et al. | ............... | 364/200 |
| 5,089,985 A * | 2/1992 | Chang et al. | ................... | 707/2 |
| 5,179,662 A * | 1/1993 | Corrigan et al. | ............... | 711/2 |
| 5,210,870 A * | 5/1993 | Baum et al. | .................... | 707/7 |
| 5,237,661 A * | 8/1993 | Kawamura et al. | ........... | 710/52 |
| 5,333,310 A * | 7/1994 | Sakai | ............................ | 707/8 |
| 5,491,810 A * | 2/1996 | Allen | ........................... | 711/117 |
| 5,581,736 A * | 12/1996 | Smith | ........................ | 711/170 |
| 5,640,561 A * | 6/1997 | Satoh et al. | ................ | 707/202 |
| 5,668,993 A | 9/1997 | Peters et al. | ................ | 395/671 |
| 5,724,584 A | 3/1998 | Peters et al. | ................ | 395/671 |
| 5,799,210 A * | 8/1998 | Cohen et al. | .................. | 710/56 |
| 5,913,164 A | 6/1999 | Pawa et al. | ................. | 455/427 |
| 5,999,916 A | 12/1999 | Peters et al. | ................. | 705/34 |
| 6,128,623 A | 10/2000 | Mattis et al. | ............... | 707/103 |
| 6,137,874 A | 10/2000 | Brown et al. | ............... | 379/220 |
| 6,178,331 B1 | 1/2001 | Holmes et al. | ............. | 455/466 |
| 6,295,575 B1 | 9/2001 | Blumenau et al. | ............. | 711/5 |

(Continued)

FOREIGN PATENT DOCUMENTS

CA 2235980 4/1998

OTHER PUBLICATIONS

Notification of Transmittal of International Search Report and the Written Opinion for International Application No. PCT/US04/00186 filed Jan. 7, 204, 13 pages, mailed Aug. 19, 2004.

*Primary Examiner*—Frantz Coby
(74) *Attorney, Agent, or Firm*—Baker Botts L.L.P.

(57) ABSTRACT

The present disclosure teaches a method and system for intelligent data management. The system preferably includes a caching service having a listener and plurality of query threads adapted to enable communications with a data type independent cache container. The listener is adapted to acknowledge requests for data access from one or more system processes or services and to connect the requesting services to a respective query thread. Once communicatively connected, the application services may leverage one or more data manipulation functions associated with the cache container to store and/or access data. For optimum efficiency with large amounts of data, the data type independent cache container is preferably constructed using a plurality of data storage vectors organized according to a hash table.

20 Claims, 5 Drawing Sheets

U.S. PATENT DOCUMENTS

| | | | |
|---|---|---|---|
| 6,332,167 B1 | 12/2001 | Peters et al. | 709/318 |
| 6,381,640 B1 | 4/2002 | Beck et al. | 709/223 |
| 6,381,674 B1 * | 4/2002 | DeKoning et al. | 711/113 |
| 6,393,112 B1 | 5/2002 | Gottlieb et al. | 379/112.01 |
| 6,447,665 B1 | 9/2002 | Johnson et al. | 205/203 |
| 6,449,695 B1 | 9/2002 | Bereznyi et al. | 711/134 |
| 6,490,722 B1 | 12/2002 | Barton et al. | 717/174 |
| 6,725,032 B1 | 4/2004 | Sheridan et al. | 455/419 |
| 2002/0007445 A1 | 1/2002 | Blumenau et al. | |
| 2002/0065694 A1 | 5/2002 | Peters et al. | |
| 2002/0078321 A1 | 6/2002 | Peters et al. | |
| 2004/0133680 A1 | 7/2004 | Sorrentino et al. | |

* cited by examiner

US 7,080,060 B2

SYSTEM AND METHOD FOR INTELLIGENT DATA CACHING

TECHNICAL FIELD OF THE INVENTION

The present invention relates generally to data processing and, more particularly, to a system and method for the intelligent management of stored data.

BACKGROUND OF THE INVENTION

High volume data processing systems typically run a myriad of processes or programs, some times running multiple copies of the same process or program. To make the necessary data available to each of these processes, many system designs call for the data to be replicated for and stored by each process. Other designs simply place a single copy of the frequently used data in a shared memory space. Such data management techniques are generally ineffective and commonly cause significant system performance degradations.

While many efforts have been extended to resolve these data sharing issues, each has either failed or presents its own limitations which make it less than desirable. For example, the most recently used/least recently used methods for managing data in many database applications is too generic for the data lookups typically required in a high volume data processing system. In array storage, another attempted resolution, performance degradation stems from fixed array capacities and data wrapping. In vector classes, a related attempt, it is typically costly for the system to manipulate the vector's contents when such content surpasses a certain volume.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present disclosure and its advantages are best understood by referring to FIGS. 1 through 6 of the drawings, like numerals being used for like and corresponding parts of the various drawings.

Figure 1:
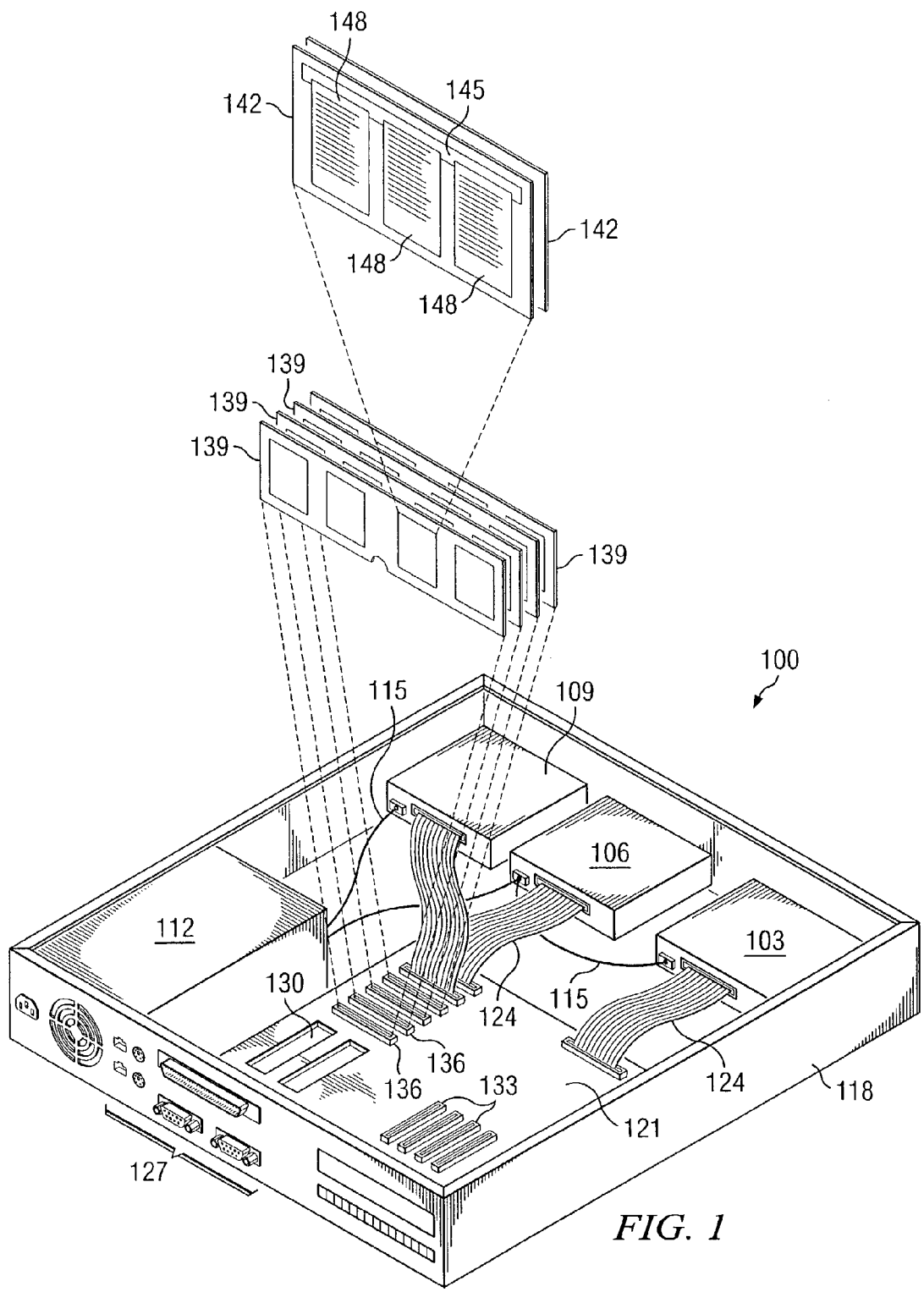
FIG. 1 is a perspective view, partially exploded, showing one embodiment of a data processing system incorporating teachings of the present invention.

Referring first to FIG. 1, one embodiment of a data processing system 100 operable to implement teachings of the present invention is shown. As illustrated, data processing system 100 may be implemented as a rack server. However, tower servers, mainframe servers as well as other configurations may be employed. Accordingly, data processing system 100 may be produced by such computer manufacturers as DELL, Hewlett Packard, Sun Microsystems, International Business Machines, Apple as well as others.

In the embodiment of data processing system 100 illustrated in FIG. 1, a number of common computing components may be compiled to create a computing device capable of processing various data types, preferably in large quantities, either on its own or in conjunction with a plurality of other data processing systems 100. As illustrated, data processing system 100 of FIG. 1 preferably includes one or more HDD (Hard Disk Drive) devices 103 and may include, but is not limited to, a FDD (Floppy Disk Drive) device 106 and a CD/RW (Compact Disc/Read Write) device 109.

Also preferably included in data processing system 100 is power supply 112. Power supply 112 may provide power to the components of data processing system 100 via power connections 115. These and other computing components may be integrated into chassis 118. Other computing components may be added and some of the aforementioned computing components removed without departing from teachings of the present invention.

At the heart of data processing system 100, as in most computing devices, is motherboard or system board 121. System board 121 typically electrically or communicatively interconnects, often with the aid of cables 124, the various computing components. Preferably included among a variety of ASICs (Application Specific Integrated Circuit) on system board 121, such as ASICs (not expressly shown) operable to enable and control communication or I/O (Input/Output) ports 127, are one or more central processing units (CPU) or processors 130. Processors 130 may include one or more processors from such manufacturers as Intel, Advanced Micro Devices, Sun Microsystems, International Business Machines, Transmeta and others. System board 118 may also include one or more expansion slots 133 adapted to receive one or more riser cards, one or more expansion cards adapted to enable additional computing capability as well as other components.

A plurality of memory slots 136 are also preferably included on system board 121. Memory slots 136 are preferably operable to receive one or more memory devices 139 operable to maintain program, process or service code, data as well as other items usable by processors 130 and data processing system 100. Memory devices 139 may include, but are not limited to, SIMMs (Single In line Memory Module), DIMMs (Dual In-line Memory Module), RDRAM (Rambus Dynamic Random Access Memory), as well as other memory structures. According to teachings of the present invention, memory devices 139 may alone, or with the aid of HDD device 103, FDD device 106, CD/RW device 109, or other data storage device, implement or otherwise effect one or more data type independent binary data cache containers 142.

As discussed in greater detail below, data cache containers 142 are preferably operable to intelligently cache data used by a plurality of services, programs or applications running on data processing system 100. Data cache containers 142 preferably organize common data shared by a number active processes, programs or services using a hashed data storage vector scheme. In general, data cache containers 142 preferably index a plurality of data storage vectors according to a hash table 145.

Figure 2:
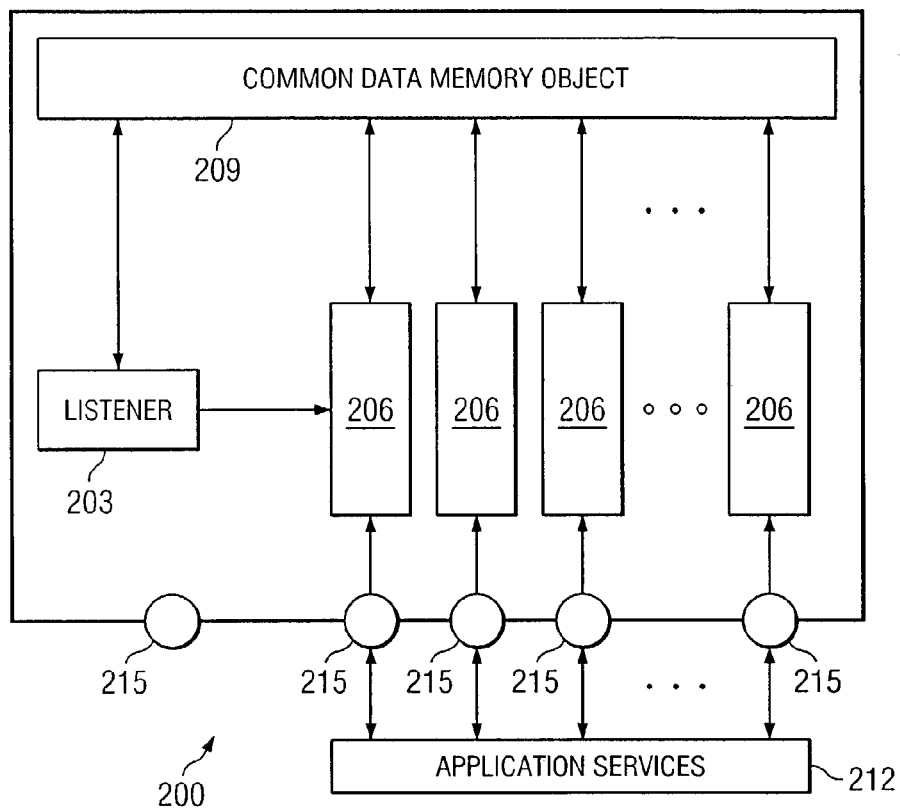
FIG. 2 is a block diagram illustrating one embodiment of a data caching service incorporating teachings of the present invention.

Referring now to FIG. 2, a block diagram depicting a common data caching service incorporating teachings of the present invention is shown generally at 200. Common data cache service 200 preferably includes listener 203, one or more query threads 206, and common data memory object 209, among other components.

In a preferred embodiment, common data cache service 200 is preferably operable to access, store or otherwise maintain information for a plurality of application programs, processes or services 212 running or executing on data processing system 100. Application services 212 may include a wide variety of data processing services as well as multiple instances of one or more of such data processing services.

For example, in a telecommunications hardware and service transaction record processing environment, application services 212 may include a variety of transaction record service instances adapted to process a selected transaction record type. In this environment, a service-based architecture, common data cache service 200 will preferably entertain all data access requests from the myriad services instances with the service instances maintaining no more logic than is necessary to know what data is necessary to effectively process its designated transaction record type and where to request access to such data. Common data cache service 200 may also, especially in a service-based architecture where common data cache service 200 is one of many service instances, provide segregated or private areas of memory or storage for use by designated ones of application services 212. Such private memory areas may be effected in a variety of manners.

As will be discussed in greater detail below with respect to FIGS. 4, 5 and 6, listener 203 is preferably operable to perform a variety of functions in the operation of common data cache service 200. In general, listener 203 preferably loops or remains in a wait state until it receives a data access request message from an application service 212. A data access request may involve a request to return the value of a stored constant, variable or other information, a request to change the value of an existing constant, variable or other information, a request to store a new constant, variable or other information, as well as other data access operations.

Upon receipt of a data access request from an application service 212, listener 203 may establish a communicative connection with the requesting one of application services 212. After connecting with the current requesting one of application services 212, in one embodiment of the present invention, listener 203 preferably endeavors to assign or designate one of query threads 206 for the requesting one of application services 212. According to one embodiment of the present invention, listener 203 may be adapted or configured to initiate additional query threads 206 to enable the requested data access. Once a query thread 206 has been initiated, assigned, or designated for the current requesting application service, listener 203 preferably hands-off the current requesting application service to the assigned or designated query thread 206. Following hand-off, listener 203 may return to its wait or loop state where it may await receipt of additional data access requests from an application service 212. In an alternate embodiment, listener 203 may be configured to process data access requests from a plurality of application services 212 substantially simultaneously.

According to teachings of the present invention, query threads 206 are preferably operable to provide a query thread, link or channel between an application service 212 and common data memory object 209. Once communications have been established or otherwise enabled between an application service 212 requesting data and common data memory object 209 via a designated one of query threads 206, the transfer of data between common data memory object 209 and the current requesting application service may be effected or permitted. Upon completion of the data access, management or other maintenance activities desired by the current requesting application service, the connection between query thread 206 and the current requesting application service may be severed or otherwise ended. Following severance, query thread 206 may be reassigned by listener 203 to the next application service 212 requesting data access.

In one embodiment of the present invention, query threads 206 may be based on IPC (Interprocess Communication) technology principles. In general, however, query threads 206 may be implemented using a technology generally adapted to permit one computing process or service to communicate with another computing process or service, whether operating on the same or different data processing system.

An IPC query thread 206 may be based on named pipe technology, in one embodiment of the invention. In general, named pipe technology is a method for passing information from one computer process or service to other processes or services using a pipe, message holding place or query thread given a specific name. Named pipes, in one aspect, may require less hardware resources to implement and use. Other technologies which may be used in the implementation of an IPC query thread 206 include, but are not limited to, TCP (Transfer Control Protocol), sockets, semaphores, and message queuing.

According to teachings of the present invention, common data memory object 209 preferably does not discriminate as to the type of data it stores, accesses or otherwise maintains. Accordingly, simple, complex, binary or virtually any other format of data may be maintained therein.

In an effort to maximize the efficiency with which common data cache service 200 operates, common data memory object 209 is preferably operable to store, access or otherwise intelligently maintain information according to a variety of methodologies. For example, as discussed further below, if the amount of data to be stored in common data memory object 209 is below a first threshold, the efficacy with which common data memory object 209 maintains or stores data may be such that caching will degrade the performance of data processing system 100. Such a threshold may involve data hit ratios, data seek or read times, as well as others. When common memory object 209 is in such a state, an application service 212 seeking data may be referred elsewhere in the data processing system 100, such as an application or service external to common data cache service 200, for processing its data access request.

As a next phase, continuing the example, common data memory object 209 may store, access or otherwise maintain information for use in accordance with a single data storage vector methodology. In a still further phase, according to teachings of the present invention, common data memory object 209 may be adapted or configured to store, access or otherwise maintain information for use in one of a number of data storage vectors, where the various data storage vectors are organized in accordance with a hash table. Further discussion regarding the variety of methods by which common data memory object 209 may access, store or otherwise maintain data or information will be discussed in greater detail below with respect to FIGS. 3, 4, 5 and 6.

As mentioned above, a service-based data processing system may benefit from teachings of the present invention. In a preferred embodiment, listener 203 and query threads 206 are preferably generated or operated as light-weight processes, as indicated at 215, for at least purposes of sharing CPU time. For example, in an embodiment of the present invention comprising one (1) listener 203 and four (4) active query threads 206, CPU time for common data cache service 200 would be distributed among six (6) processes, common data cache service 200, listener 203, and the four (4) query threads 206. The result of such an implementation permits an existing operating system running on data processing system 100 to assume management responsibilities for the slicing of CPU time between each of light-weight processes 215. In an alternate embodiment, an additional application service 212 may be developed and provided to govern or otherwise manage the sharing of CPU or other hardware time among the varied processes, programs or services running on data processing system 100. Other methods of CPU and hardware management or sharing may be employed without deporting from the spirit and scope of the present invention.

According to teachings of the present invention, common data memory object 209 preferably uses specific classes to store and access reference or shared data. In addition, sorting data in data storage vectors typically provides faster data access times when a medium to large number of entries reside in a vector. Further, hashing data into buckets, where the buckets comprise data storage vectors, has proven to be effective in breaking up large lists of data into smaller, more manageable and identifiable blocks of data.

Figure 3:
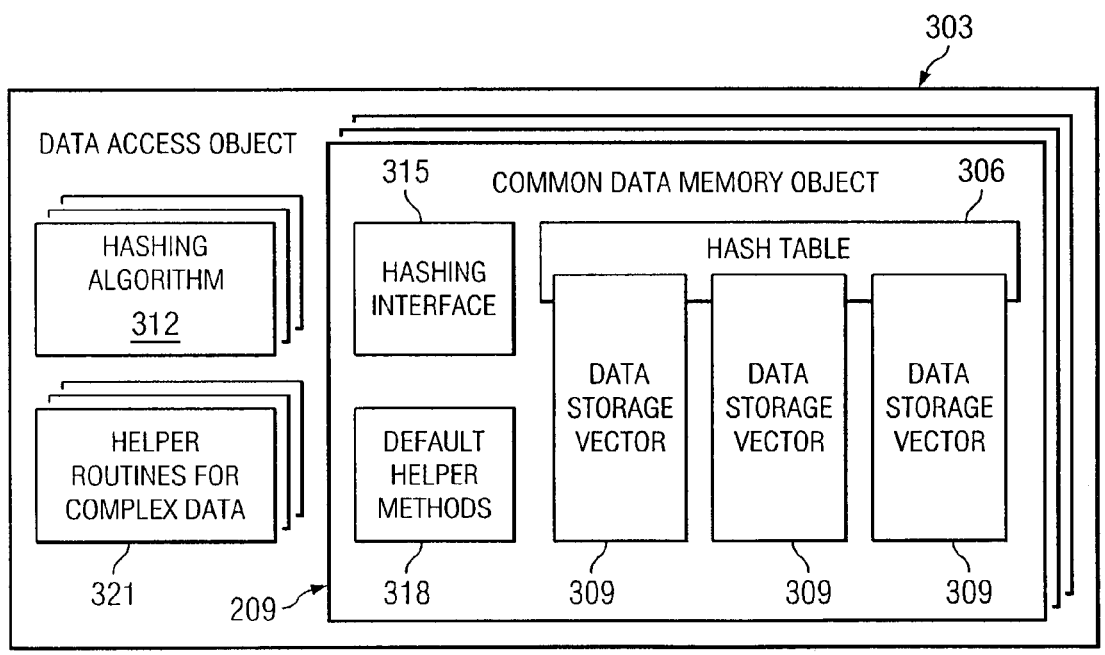
FIG. 3 is a block diagram illustrating one embodiment of a common data memory object incorporating teachings of the present invention.

As illustrated in FIG. 3, merging these methods enables more intelligent data management routines to be implemented in common data memory object 209 and further allows data to be efficiently stored, accessed or otherwise maintained in data access object 303 and common data memory object 209. In general, according to teachings of the present invention, common data memory object 209 is preferably based on two storage classes or techniques, hashing and data storage vectors. Conceptually, hashing enables the creation of hash table 306 which in turn provides a data container adapted to hold multiple data storage vectors 309 or buckets.

Hashing, in general, involves the generation of a key representing a bucket of data in the cache in which a single item may be stored. Duplicate hash key values may be generated to allow for the even distribution of data across a multitude of bucket containers. Hash table 306 preferably enables common data memory object 209 to provide a varying number of entries to aid in locating stored data.

Data storage vectors 309 may be used to provide a container-managed method for storing a dynamic amount of data in one or more lists. Data storage vectors 309 are preferably created in such a way that initial and next allocations may be used to minimize the amount of memory allocations and copying when data lists contained therein grow. Increasing the efficiency desired in a high volume data processing system, such as data processing system 100, may be furthered by sorting the data items in each of data storage vectors 309. Sorting the data typically permits each data storage vector 309 to be searched using a binary split algorithm, further increasing the efficiency with which common data memory object 209 may serve.

Some data, such as complex data structures, does not lend itself to the use of hashing or hash table 306. However, according to teachings of the present invention, one or more routines, such as complex data helper routines 321, may be provided which are adapted to generate or create a unique identifier from such complex data that may be used by hash table 306. In the event one or more of application services 212 seeks to access, store or otherwise maintain complex data, e.g., a data structure as defined in the C/C++ programming language, common data memory object 209 may consult one or more of hashing algorithms 312 via hashing interface 315 and/or one or more of complex data helper routines 321 to effect such function or operation. Similarly, when a requesting application service seeks to access, store or otherwise maintain simple data, such as an integer or character string, hashing algorithms 312 and hash table 306 may be employed to determine in which data storage vector 309 the simple data should be placed.

As suggested above, the various functions with which data access object 303 operates may be effected or aided by default helper routines 318 or complex data helper routines 321. For example, searches for data in data storage vectors 309 may be aided, for simple data searches, by default helper methods 318 and, for complex data searches, by complex data helper routines 321. Complex data helper routines 321 may be implemented as a function class defined in data access object 303 or otherwise. Data access object 303 preferably informs common data memory object 209 of its complex data helper routines 321 when common data memory object 209 is constructed. In one aspect, once common data memory object 209 is constructed with complex data helper routines as a parameter, the default helper methods 318 inside common memory object 209 may be replaced. Complex data helper routines 321 may also be provided by data access object 303 to enable the performance of binary split searches as well as list scanning searches for the subject data of a data access request.

In one implementation, once complex data is stored in one of common data memory objects 209, data access object 303 may provide a pointer to one or more functions, program operations or services operable to perform binary split searches, list scanning, as well as other processes. Preferably included among the class of functions, programs, operations, processes or services implemented in default helper methods 318 or complex helper routines 321 to store, access or otherwise maintain complex data are a 'below vector range' test, an 'above vector range' test, a 'first item' vector comparison test, a 'last item' vector comparison' test, an 'equality to' vector item test, and a 'less than' vector item test. Additional and/or alternative tests or methods may be employed to manipulate data contained in common data memory object 209 without departing from the spirit and scope of the present invention.

Data caching service 200 of the present invention is preferably designed for intelligent caching, accessing and other data manipulation operations. One aspect for which data caching service 200 is designed to operate intelligently is the manner in which data contained data storage vectors 309 is searched. For example, when one or more of data storage vectors 309 contains a large amount of data, it may be more efficiently searched if the data storage vectors 309 are sorted and searched using a binary split algorithm rather than a list scan methodology.

To perform intelligently, one or more performance parameters may be established which, when encountered, will cause data caching service 200, common data memory object 209, or data access object 303 to reformat, reorder or otherwise adjust the manner in which common memory object 209 stores, searches, accesses or otherwise maintains data. Examples of such performance parameters include, but are not limited to, search hit ratios, seek times for searched data, the amount of data stored in one or more of common data memory objects 209 or in one or more of data storage vectors 309, as well as other memory or search performance metrics. In pursuit of dynamic and intelligent performance, an automated method or process to determine or evaluate the current performance of storage, access or maintenance operations as compared to one or more performance parameters or metrics may be designed such that when one or more of the performance parameters is not met, common data memory object 209 may be adjusted, reformatted or otherwise altered. Alternatively, benchmarks for the one or more performance parameters may be established within the system such that a process or routine running on the system may evaluate recent values of system performance parameters, compare them to one or more performance thresholds, benchmarks or metrics and initiate, as may be suggested, a restructuring of one or more common data memory objects 209 associated with a data access object 303.

In another aspect, a data processing system 100 incorporating teachings of the present invention may be designed to dynamically and intelligently adjust the manner in which data is maintained in common data memory object 209. At first, common data memory object 209 may be implemented such that it caches no data. For example, when it would cost less in system resources to keep the data sought by one or more application services 212 in a simple storage area, common data memory object 209 may cache no data. Once a threshold, performance parameter, benchmark or metric, for accessing, storing or otherwise maintaining data in common data memory object 209 is surpassed, common data memory object 209 may be reconfigured such that it begins caching data in a single data storage vector. Further, in response to achieving a second threshold, performance parameter, benchmark or metric, common data memory object 209 may be reconfigured to migrate from single data vector storage to the hashed data storage vector model of FIG. 3. Other migrations between data storage methodologies and implementations are considered with the scope of the present invention.

Figure 4:
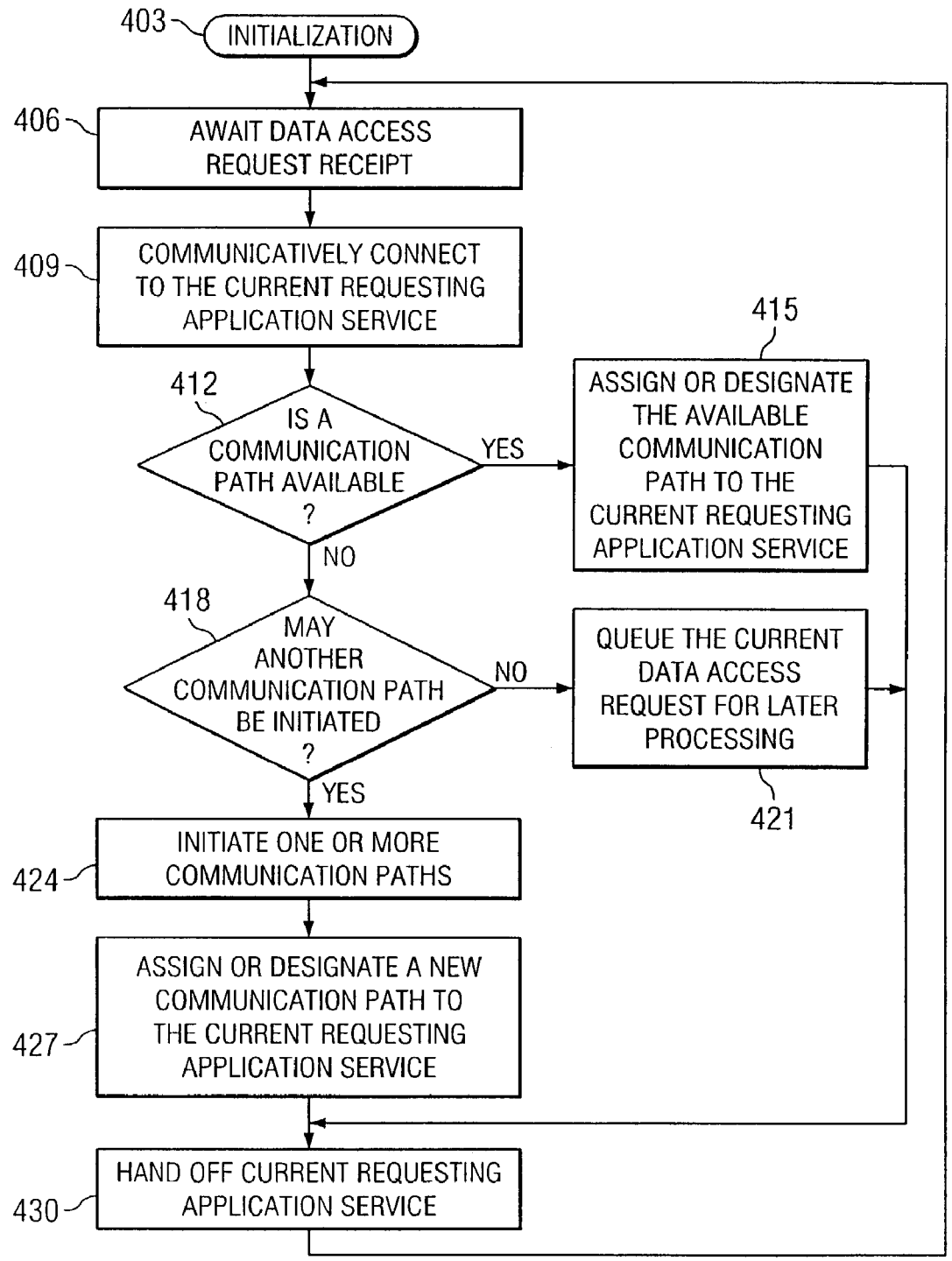
FIG. 4 is a flow diagram illustrating one embodiment of a method for implementing a data caching service incorporating teachings of the present invention.

Referring now to FIG. 4, a flow diagram generally illustrating a method of operation for listener 203 is shown at 400, according to teachings of the present invention. Upon initialization of common data service 200 at 403, method 400 preferably proceeds to 406.

At 406, listener 203 preferably remains in a wait or loop state until it receives one or more data access requests from one or more of application services 212. As suggested generally in FIG. 2 above, common data cache service 200 is preferably operable to support a plurality of data access requests substantially simultaneously. Such multithreading capabilities may be supported by enabling one or more listeners 203 to execute in common data cache service 200 and/or through the existence of a plurality of query threads 206. Upon receipt of a data access request from an application service 212, method 400 preferably proceeds to 409.

At 409, listener 203 preferably communicatively connects to the application service 212 from which the data access request was received, i.e., the current requesting application service. In one aspect, communicatively connecting with the current requesting application service may enable listener 203 to identify one or more characteristics of the data access request submitted by the requesting application service. For example, if query threads 206 are implemented using a named pipe technology, listener 203 may need to identify to which named pipe the current requesting application service should be assigned at 409. In another example, listener 203 may be adapted to discern the type of data sought to be accessed, stored or otherwise maintained by the current requesting application service at 409. Once listener 203 has effectively coupled with the current requesting application service at 409, method 400 may proceed to 412.

Listener 203 preferably begins the process of assigning or designating a query thread 206 to the current requesting application service at 412. To begin, listener 203 preferably reviews, analyzes or otherwise evaluates the operating status of one or more existing query threads 206 to determine whether one or more is available for use by the current requesting application service. In one embodiment of the present invention where query threads 206 utilize TCP technology, listener 203 may identify the first or any currently or soon to be available query thread 206. Alternatively, in an embodiment of the present invention where query threads 206 are based on named pipe technology, listener 203 may determine whether an appropriately named pipe is available for the current requesting application service. Listener 203 may also be adapted to identify the least recently used query thread 206 or to keep a use-listing through which listener 203 may cycle to ensure that each query thread 206 is periodically used. If at 412 listener 203 identifies an available existing query thread 206 for use by the current requesting application service, method 400 preferably proceeds to 415. Alternatively, if listener 203 determines that a query thread 206 is not currently available at 412, method 400 preferably proceeds to 418.

At 415, listener 203 may designate or assign an available query thread 206 to the current requesting application service. Designating or assigning a query thread 206 to a current requesting application service 212 may involve notifying query thread 206 to expect the current requesting application service to soon be connecting. Alternatively, listener 203 may inform the current requesting application service of the specific query thread 206 which listener 203 has designated or assigned for its use. Such notification may result from listener 203 sending the current requesting application service an address or name for the assigned query thread 206. Further, listener 203 may initiate a connection between the assigned or designated query thread 206 and the current requesting application service. Once an available query thread 206 has been designated or assigned to the current requesting application service, method 400 preferably proceeds to 430.

In response to the unavailability of a query thread 206 at 412, listener 203 will preferably determine whether an additional query thread 206 may be initiated at 418. In one embodiment of the present invention, the number of query threads 206 may be limited in order to prevent the processing capabilities of system 100 from being depleted. In such an implementation, listener 203 may determine whether the total number of active or existing query threads 206 exceeds or is in accordance with a preferred system limit on query threads 206 at 418. If listener 203 determines that the number of active or existing query threads 206 is below the preferred system limit, method 400 preferably proceeds to 424. Alternatively, if listener 203 determines that the number of active or existing query threads 206 meets or exceeds the threshold number of query threads 206, method 400 preferably proceeds to 421.

At 421, in response to having the preferred maximum number of allowed query threads 206 already existing or active, listener 203 may assign or designate a message queue associated with one or more of the active or existing query thread 206 for the current requesting application service. Subsequent to queuing the current data access request, the current requesting application service will preferably have its data access request held in the queue for processing until a query thread 206 becomes available. In designating a queue to hold a data access request for processing, listener 203 may be further configured to determine which queue will likely be able to process the data access request the soonest, for example. Further, listener 203 may also be configured to evaluate the quantity of data access requests or other operations pending in a queue of one or more existing query threads 206 and assign or designate the queue with the least amount of processing remaining as the queue for the current data access request. Following queuing of the data access request, method 400 preferably proceeds to 430.

In response to a determination that the number of active or existing query threads 206 does not exceed a system limit, listener 203 may initiate one or more additional query threads 206 at 424. Depending on the implementation of query threads 206, listener 203 may be required to generate an appropriately named pipe or query thread for use by the current requesting application service. Alternatively, in a TCP-based query thread 206 embodiment of the present invention, listener 203 may need only initiate an additional TCP enabled query thread 206. Once an additional query thread 206 has been initiated in accordance with the appropriate query thread 206 technology parameters, method 400 preferably proceeds to 427 where the newly initiated query thread 206 may be assigned or designated for use by the current requesting application service. Upon designation of a query thread 206 at 427, method 400 preferably proceeds to 430.

At 430, listener 203 preferably passes or hands-off the current requesting application service to the assigned or designated query thread 206. Once the current requesting application service 212 has been handed-off, method 400 preferably returns to 406 where listener 203 may loop or wait to receive the next data access request from one or more of application services 212.

Figure 5:
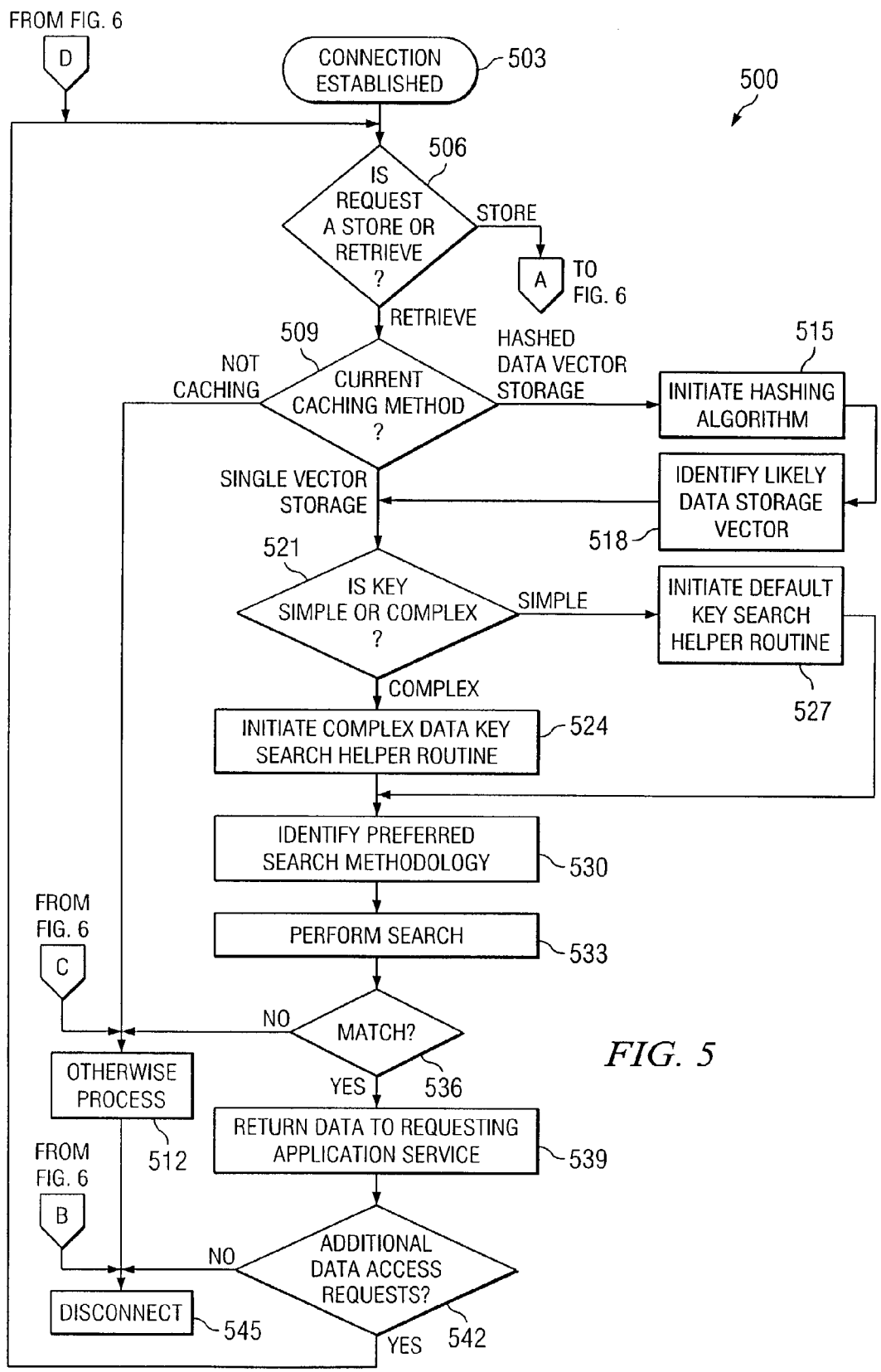
FIGS. 5 and 6 are flow diagrams illustrating one embodiment of a method for maintaining a common data memory object incorporating teachings of the present invention.
Figure 6:
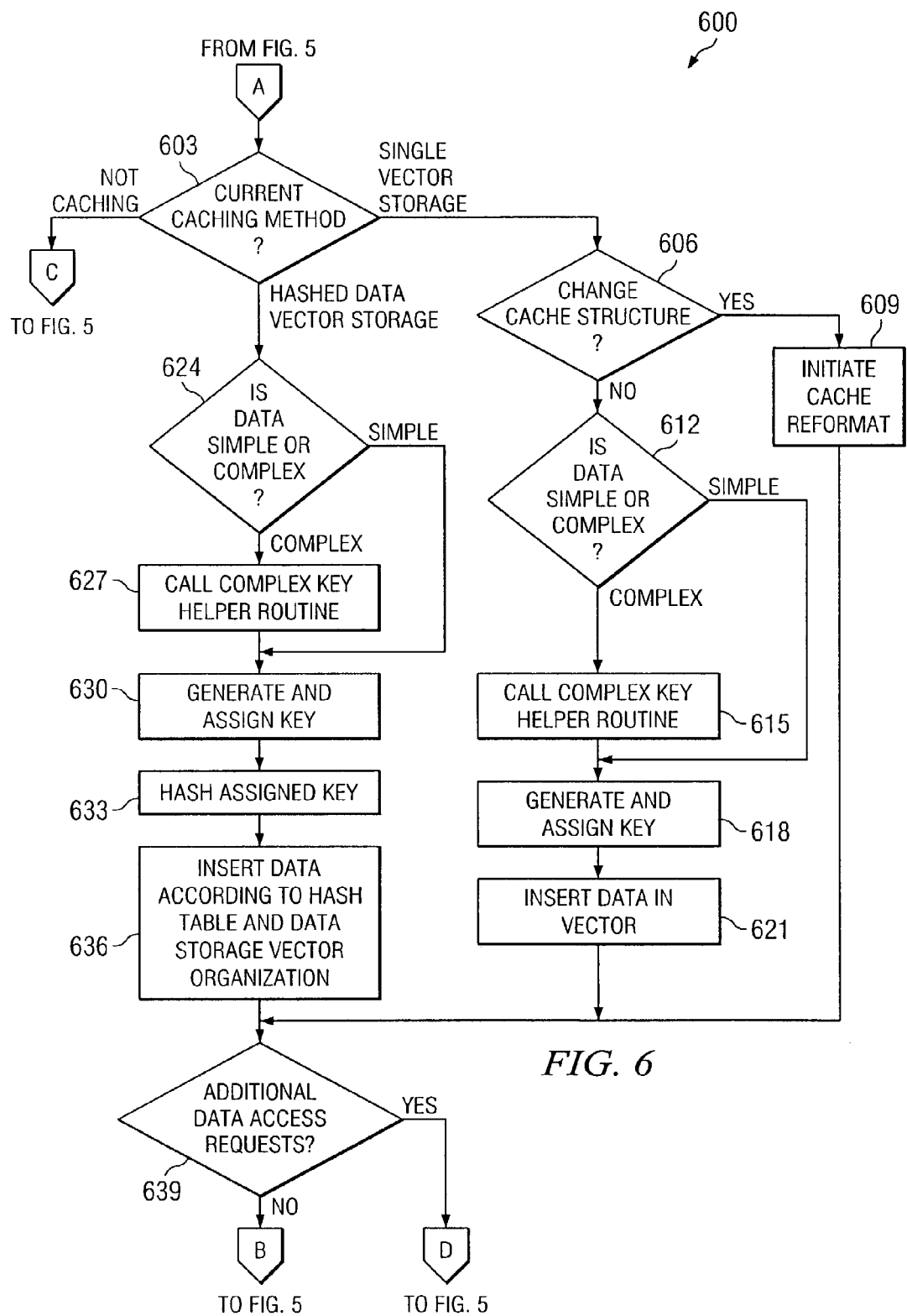

Referring now to FIGS. 5 and 6, flow diagrams depicting one embodiment of a method for implementing a common data memory object are shown. Methods 500 and 600 of FIGS. 5 and 6, respectively, preferably begins at 503 after hand-off of the current requesting application service and upon connection of the requesting application service to the query thread 206. Following effective or communicative connection between the current requesting application service and its designated query thread, method 500 preferably proceeds to 506.

At 506, the data access request generated by the current requesting application service may be evaluated to determine whether the data access request is seeking to store data to or retrieve data from common data memory object 209. Depending on the format of the data access request, a variety of interrogation routines may be used to make the determination of whether a store or retrieve operation is sought by the current requesting application service. If it is determined that the data access request seeks to retrieve data from common data memory object 209, method 500 preferably proceeds to 509. Alternatively, if it is determined that the data access request seeks to store information in common data memory object 209, method 500 preferably proceeds to 603 of method 600 in FIG. 6.

To begin processing of a retrieve data access request, the current structure or caching methodology of common data memory object 209 may be identified or determined at 509. The current structure or caching methodology of common data memory object 209 may be determined to enable data caching service 200 to initiate or call the routines necessary to process the current data access request. Accordingly, whether or not common data memory object 209 is currently caching data, is caching data in a single vector or is caching data in hashed data vector storage is preferably determined at 509.

If at 509 it is determined that common data memory object 209 is not currently caching data, e.g., because there is too little data to make caching efficient, method 500 may proceed to 512. At 512, processing of the current data access request may be otherwise effected. In one embodiment, the current requesting application service and/or data access request may be referred to an external application for processing. Alternatively, the data access request may be processed from a simple storage area implemented by common data memory object 209.

However, if it is determined at 509 that common memory object 209 is currently storing data in accordance with the hashed vector caching method of the present invention, method 500 preferably proceeds to 515. At 515, the hashing algorithm used to generate hash table 306 may be initiated. The hashing algorithm initiated and used may be selected from default helper methods 318, hashing algorithms 312 or from an alternate source. As mentioned above, the hashing algorithm employed may be determined or dictated by whether the data stored in one or more common data memory objects 209 of a data access object 303 is complex or simple.

Following initiation of the appropriate hashing algorithm at 515, method 500 preferably proceeds to 518. At 518, the current data access request and selected hashing algorithm may be employed to identify the data storage vector 309 likely to hold the data sought. For example, the subject data of the data access request may be hashed according to the hashing algorithm such that the data storage vector 309 in which the actual data would be stored if written to the current common data memory object 209 may be identified. Upon identification at 518 of the appropriate data storage vector 309, method 500 preferably proceeds to 521.

At 521, in response to a determination at 509 that common memory object 209 is employing a single vector storage structure or following identification of a likely data storage vector at 518, a determination may be made as to whether a key assigned to the data sought in the data access request is simple or complex. According to teachings of the present invention, complex data is assigned a complex key generated by one or more complex data helper routines 321. Simple data, on the other hand, may be assigned a key by one or more of default helper routines 318. Whether it is determined that the assigned key is complex or simple, method 500 preferably proceeds to 524 or 527, respectively.

At 524, a complex data key search helper routine may be called or initiated from complex data helper routines 321. At 527, a default search helper routine operable to search simple keys may be called or initiated from default helper routines 318. Upon initiation of the appropriate key search helper routine, method 500 preferably proceeds to 530.

At 530, selection of an optimum search methodology may be performed. According to teachings of the present invention, stored data may be searched via a list scan, binary search algorithm or otherwise. If the amount of data in a data storage vector 309 is below a certain level, a list scan may be the fastest search method available. Alternatively, if the amount of data in a data storage vector 309 is above a certain threshold, a binary split search may provide the quickest search results. Alternative search may be employed and may depend on the system used, the data stored as well as a number of other factors.

Using the preferred search methodology identified at 530 and the appropriate data key search helper routine, method 500 preferably proceeds to 533 where a search in accordance with the preferred search methodology may be performed.

Upon performing the search at 533, a determination regarding whether a match has been located may be performed at 536.

If after exhausting the data contained in the common data memory object 209 a match has not been found, method 500 may proceed from 536 to 512 where the current requesting application service may be otherwise processed, such as referred to an external application for additional processing. Alternatively, if at 536 a match is determined to have been located, method 500 may proceed to 539 where the data is preferably returned or communicated to the requesting application service from common data memory object 209 the requesting application service's assigned query thread 206.

After returning the requested data to the requesting application service at 539, method 500 preferably proceeds to 542 where the current requesting application service may be polled or interrogated to determine whether one or more additional data access requests remain for processing. If it is determined that one or more additional data access requests remain to be processed at 542, method 500 preferably returns to 506 where the next data access request may be processed. Alternatively, if it is determined that the current requesting application service contains no further data access requests at 542, method 500 preferably proceeds to 545 where the query thread 206 and current requesting application service may be disconnected, freeing query thread 206 for communication with the next requesting application service and returning current application service to its own processing operations.

As mentioned above, a current data request may be otherwise processed at 512. Also as mentioned above, the current requesting application service may be referred to one or more external routines for such processing. For example, if at 509 it is determined that common data memory object 209 is not presently caching data, for fulfillment of a data access requested received from the current requesting application service, one or more external routines may be necessary to retrieve, store or otherwise maintain the object of the data access request. Alternatively, if upon completion of the optimum search methodology at 536, the data sought to be accessed, stored or otherwise maintained by the current requesting application service has not been found, one or more external applications or services may be necessary for the data access request to be processed to completion. Alternative measures for solving the issues which may occur at 509 and 536 of method 500 may also be implemented without departing from the spirit and scope of the present invention. In the event method 500 proceeds to 512, method 500 then preferably proceeds to 545 where query thread 206 and the current requesting application service may be disconnected as described above.

Referring now to FIG. 6, one embodiment of a continuation of method 500 is shown. Illustrated generally at 600 in FIG. 6 is one embodiment of a method for storing data in accordance with teachings of the present invention. As mentioned above, a received data access request may be interrogated or evaluated to determine whether it contains a retrieve or store operation at 506. If it is determined that the received data access request contains a store operation, method 500 preferably proceeds from 506 to 603.

At 603, similar to 509, the current data storage structure or methodology employed by common data memory object 209 may be determined. Similar to the processing of a data retrieval request, the structure or methodology with which common data memory object 209 is currently storing data will generally dictate how data to be added may be stored.

If it is determined at 603 that common data memory object 209 is not currently caching data, method 600 preferably proceeds from 603 to 512 where the current requesting application service may be referred to an external service in accordance with the description above. However, if it is determined at 603 that common data memory object 209 is currently storing data in accordance with a single vector data storage method, method 600 preferably proceeds to 606.

At 606, a determination may be made regarding the efficiency with which common data memory object 209 is currently maintaining data. Specifically, a determination is preferably made at 606 regarding whether the addition of the data sought to be stored in the current data access request suggests that a change in the current storage structure employed by common data memory object 209 should be effected.

For example, according to teachings of the present invention, when a certain amount of data is to be shared by a plurality of application service 212 or processes, the data may be more efficiently shared by maintaining the data according to the hashed data vector storage method disclosed herein. Therefore, should the addition of the current data to an existing single data storage vector push the amount of stored data over the threshold amount, data processing system 100, data access object 303 or common data memory object 209 may be adapted to recognize such an event and initiate a cache reformatting in an effort to increase data access efficiency. Other thresholds from which a cache structure change may be suggested or intimated include, but are not limited to, hit ratios, seek return times, read times, as well as others.

Accordingly, if at 606 it is determined that the addition of the current data suggests an alternate method of storing data would be more efficient, method 600 preferably proceeds to 609. At 609, a reformatting of the current common data memory object 209 cache structure may be initiated. In one embodiment, a routine adapted to reconfigure the format of the current data cache may be initiated. The data will preferably be stored in the reformatted common data memory object 209 before method 600 proceeds to 639.

However, if at 606 it is determined that the addition of data sought to be stored by the current data access request does not suggest a change in the format of common data memory object 209, method 600 preferably proceeds to 612. At 612, the data to be stored may be evaluated for a determination regarding whether the data is complex or simple. If the data sought to be stored is complex, method 600 preferably proceeds to 615 where a complex key generation and assignment helper routine may be called or initiated before proceeding to 618. Alternatively, if the current data access request seeks to store simple data, method 600 preferably proceeds to 618.

At 618, a key is preferably generated and assigned for the simple or complex data in accordance with the appropriate key helper routine. For example, if there is complex data to be stored, such as a data structure having fields one (1) through ten (10), the complex key generation and assignment helper routine called at 615 may select data from one or more of the ten (10) fields to generate a key which will be used to store and sort the data as well as for comparisons in data searches. In the case of a simple key, such as when the data to be stored or searched consists of a string of characters, the key may be defined using an offset and a length. For example, if the simple data consists of a string thirty (30) characters long, a simple key for the data may be defined beginning at character four (4) and carrying forward for ten (10) characters. As with the complex key, the simple key is preferably employed to store and sort the data within the data storage vectors. In addition, the assigned keys are also preferably employed during data searches for comparison and matching purposes.

At 621, after a complex or simple key has been generated and assigned in accordance with the appropriate key generation and assignment helper routine at 615, the data is preferably stored in the single vector maintained by common data memory object 209. As mentioned above, the data is preferably positioned within the single storage vector according to its assigned key. After inserting the data at its appropriate location in the single vector at 621, method 600 preferably proceeds to 639.

If the current cache implementation identified at 603 determines that common data memory object 209 is currently storing information using a the hashed vector caching methodology teachings of the present invention, method 600 preferably proceeds to 624. At 624, the data to be stored may be evaluated for a determination regarding whether the data is complex or simple. If the data sought to be stored is complex, method 600 preferably proceeds to 627 where a complex key generation and assignment helper routine may be called or initiated before proceeding to 630. Alternatively, if the current data access request seeks to store simple data, method 600 preferably proceeds to 630 where a key is preferably generated and assigned for the simple or complex data in accordance with the appropriate key helper routine. The operations preferably performed at 624, 627 and 630 may proceed in a manner similar to that described above at 612, 615 and 618, respectively.

After a key has been generated and assigned at 630, method 600 preferably proceeds to 633 where the assigned keys may be hashed in accordance with a preferred hashing algorithm employed by caching data service 200 and common data memory object 209. Employing the hashed key, hash table 306 and one of data storage vectors 309, at 636 of method 600, the data may be inserted into its appropriate storage location.

Proceeding to 639 from either 609, 621 or 636, the current requesting application service may be polled or interrogated to determine whether any data access requests remain to be processed. If one or more data access requests from the current data requesting application service remain to be processed, method 500 preferably proceeds from 639 to 506 where the additional data access requests may be processed in accordance with methods 500 and 600 of FIGS. 5 and 6, respectively. Alternatively, if it is determined at 639 that the current requesting application service has no more additional data access requests for processing, method 600 preferably proceeds from 639 to 545 where the current requesting application service and its assigned or designated query thread 206 may be disconnected from one another.

Although the present invention and its advantages have been described in detail, it should be understood that various changes, substitutions, and alterations may be made hereto without departing from the spirit and scope of the invention as defined by the following claims.

What is claimed is:

1. A method for managing memory in a data processing system, comprising:
   maintaining a common memory component, the common memory component including a plurality of storage vectors indexed by a hash table;
   receiving at least one data access request from at least one application service;
   connecting to the requesting application service;
   assigning a common memory query thread to the requesting application service;
   connecting the common memory query thread and the requesting application service;
   communicating between the common memory component and the requesting application service;
   accessing, by the common memory component, data in accordance with the data access request received from the requesting application service;
   disconnecting the query thread from the requesting application service upon completion of the data access request; and
   providing at least one helper service, the helper service operable to access complex data stored in the common memory component.

2. A system for maintaining data, comprising:
   at least one memory;
   a processor operably coupled to the at least one memory;
   a first sequence of instructions storable in the memory and executable in the processor, the first sequence of instructions operable to receive a data access request from a first application service, designate a query thread for use by the first application service, hand-off the first application service to the query thread whereby the first application service may interact with a common data memory object, and await receipt of an additional data access request whereupon the operations of receive, designate, hand-off and await may be repeated; and
   a second sequence of instructions cooperating with the first sequence of instructions, the second sequence of instructions operable to store data common to a plurality of application services in the common data memory object and search the common data in the common data memory object upon request by an application service.

3. The system of claim 2, further comprising the first sequence of instructions operable to initiate one or more additional query threads adapted to permit a requesting application service to communicate with the common data memory object.

4. The system of claim 2, further comprising the second sequence of instructions operable to store data in the common data memory object using a plurality of data storage vectors.

5. The system of claim 4, further comprising the second sequence of instructions operable to assign a key to data stored in the plurality of data storage vectors.

6. The system of claim 5, further comprising the second sequence of instructions operable to store the data in the data storage vectors according to the assigned key and search for data by matching the assigned key with a key derived from the data access request.

7. The system of claim 5, further comprising the second sequence of instructions operable to assign a key to complex data generated by a complex data key helper routine.

8. The system of claim 4, further comprising the second sequence of instructions operable to store data in the plurality of data storage vectors in accordance with a hash table.

9. The system of claim 2, further comprising the second sequence of instructions operable to select a method for storing data according to one or more common data memory object performance parameters.

10. The system of claim 2, further comprising the second sequence of instructions operable to select a method for searching the data according to one or more common memory object performance parameters.

11. The system of claim 2, further comprising the second sequence of instructions operable to allocate sections of the common memory object for use by individual application services.

12. A method for storing and accessing data, comprising:
receiving data to be stored;
automatically determining a performance parameter for existing data in storage, the performance parameter comprising a measure of the performance of a memory object; and
automatically selecting a manner in which to store the received data based at least on the automatically determined performance parameter, including:
if the performance parameter is below a first threshold, storing the data in accordance with a first storage method;
if the performance parameter is between the first threshold and a second threshold, assigning a key to the data and storing the data in a data storage vector; and
if the performance parameter is above the second threshold, assigning a key to the data and storing the data in one of a plurality of data storage vectors and in accordance with a hash table associated with the plurality of data storage vectors.

13. The method of claim 12, further comprising:
determining whether the data to be stored is simple data or complex;
if the data is simple, defining the key as an array of characters located by an offset and length within the simple data; and
if the data is complex, calling a helper routine adapted to define the key.

14. The method of claim 13, further comprising calling a helper routine operable to search the assigned complex keys.

15. The method of claim 12, further comprising maintaining a listener operable to receive data access requests from a plurality of application services and connect the requesting application services to respective data container query threads.

16. The method of claim 15, further comprising initiating, by the listener, additional data container query threads.

17. The method of claim 12, further comprising sorting the data in the data storage vectors.

18. The method of claim 17, further comprising searching the sorted data storage vectors using a binary split algorithm.

19. The method of claim 12, further comprising searching the data in the data storage vectors according to assigned key.

20. The method of claim 12, further comprising restructuring data remaining in the data storage vectors according to the first storage method in response to the performance parameter falling below the first threshold.

* * * * *